US008219804B2

(12) United States Patent
Hong

(10) Patent No.: US 8,219,804 B2
(45) Date of Patent: Jul. 10, 2012

(54) APPROACH FOR MANAGING DEVICE USAGE DATA

(75) Inventor: Jiang Hong, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 941 days.

(21) Appl. No.: 11/854,942

(22) Filed: Sep. 13, 2007

(65) Prior Publication Data

US 2009/0077654 A1     Mar. 19, 2009

(51) Int. Cl.
H04L 29/06 (2006.01)

(52) U.S. Cl. ........ 713/156; 713/150; 713/159; 713/169; 713/172; 713/181; 713/185; 726/9; 726/20

(58) Field of Classification Search ............. 726/20–25, 726/9; 713/150, 156, 159, 169, 172, 181, 713/185
See application file for complete search history.

(56) References Cited

U.S. PATENT DOCUMENTS

| 5,970,143 | A  | * | 10/1999 | Schneier et al. | 713/181 |
|---|---|---|---|---|---|
| 6,389,542 | B1 | * | 5/2002 | Flyntz | 726/17 |
| 7,036,012 | B2 | * | 4/2006 | Charrin | 713/169 |
| 7,047,558 | B1 | * | 5/2006 | Mariana | 726/3 |
| 7,152,230 | B2 | * | 12/2006 | Sato et al. | 717/178 |
| 7,232,073 | B1 | * | 6/2007 | de Jong | 235/487 |
| 7,357,313 | B2 | * | 4/2008 | Uchiyama et al. | 235/380 |
| 2001/0000814 | A1 | * | 5/2001 | Montgomery et al. | 710/10 |
| 2002/0022472 | A1 | * | 2/2002 | Watler et al. | 455/405 |
| 2002/0040936 | A1 | * | 4/2002 | Wentker et al. | 235/492 |
| 2002/0138549 | A1 | * | 9/2002 | Urien | 709/202 |
| 2005/0154898 | A1 | * | 7/2005 | Chao | 713/185 |
| 2005/0172118 | A1 | * | 8/2005 | Nasu | 713/156 |
| 2006/0101509 | A1 | * | 5/2006 | Bossemeyer et al. | 726/9 |
| 2007/0168286 | A1 | * | 7/2007 | Nishioka et al. | 705/51 |
| 2007/0187493 | A1 | * | 8/2007 | Hong et al. | 235/382 |
| 2008/0011828 | A1 | * | 1/2008 | Mysore | 235/380 |
| 2008/0155260 | A1 | * | 6/2008 | Perez et al. | 713/169 |

FOREIGN PATENT DOCUMENTS

EP     1400888 A2 *  3/2004

* cited by examiner

*Primary Examiner* — Nabil El Hady
(74) *Attorney, Agent, or Firm* — Hickman Palermo Truong Becker Bingham Wong LLP

(57) ABSTRACT

Techniques are provided for securely managing, using smart cards, the usage of a peripheral device. In one embodiment, both the peripheral device and the smart card have digital certificates and a means for authenticating each other. Each device requires authentication of the other device before access to the device's resources is granted. In one embodiment of the invention, the smart card executes a local Java application for managing usage data. The application provides quota and prior usage data to the peripheral device, and updates on the smart card usage data provided by the peripheral device. The usage data on the smart card is used to limit, audit, or track access to resources and operations on the peripheral device. In another embodiment, the authentication and usage management functions of the smart card is implemented on a remote server.

26 Claims, 6 Drawing Sheets

APPROACH FOR MANAGING DEVICE USAGE DATA

FIELD OF THE INVENTION

The present invention relates to managing usage of printing and imaging devices, and in particular, using smart cards with multifunction peripherals to manage usage data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

To control costs, organizations audit the usage of their peripheral devices, such as printing and imaging devices. The devices include printers, scanners, photocopiers, and facsimile machines. The functionality of these devices may be combined into one device, called a multifunctional peripheral, or an MFP. To secure its systems, organizations limit access to their peripheral devices by employing certain security measures.

In a prior approach, for example, a student would use a campus card that contains identifying information about the student to gain access to the operations and resources on a school's peripheral devices. The campus card would contain static identifying data stored on a magnetic stripe. A student typically inserts the card into a card reader that is attached to the peripheral device, and the student is authenticated by a user identification and a password that are entered by the student into a console or keypad.

Under the prior approach, because the campus card contains only static data, and has no storage or processing capability, any operation that requires processing would need to be executed by another device. For example, a personal computer that is coupled to the peripheral and the card reader may be used to audit and manage the usage of the peripheral's operations and resources, or to provide more sophisticated forms of user authentication, such as digital certificate authentication.

SUMMARY

Techniques are provided for securely managing, using smart cards, the usage of a peripheral device, for example, a printer, a scanner, a photocopier, a facsimile machine, or a multifunctional peripheral device ("MFP") that combines the functionality of two or more of the above-mentioned devices. While the examples herewith provide techniques for managing the usage of MFPs, or for the consumption of resources on MFPs, the techniques may be applied to other devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

I. Overview

A method is provided for tracking usage of a network device. The network device first establishes communication with a smart card. Next, it receives the smart card's digital certificate. The network device authenticates the smart card based on the smart card's digital certificate. Then, the network device receives a request from the smart card for the network device's second digital certificate. The network device submits the second digital certificate to the smart card for authentication. Based on successful dual authentication of the digital certificates of the network device at the smart card, respectively, the network device provides user access to device operations. The network device generates usage data that indicate usage of the device operations, and finally, the network device communicates the usage data to a usage management application executing on the smart card.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

II. Architecture Overview

Figure 1A:
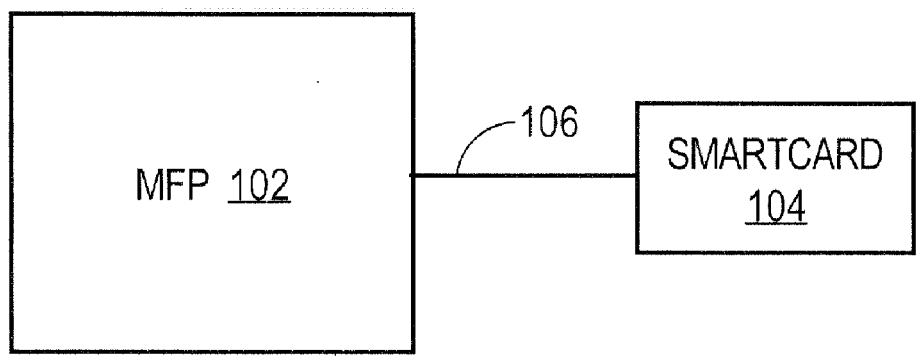
FIG. 1A is a block diagram that illustrates a smart card in relation to a multifunctional peripheral device, according to one embodiment of the invention.

FIG. 1A is a block diagram that illustrates an overview of the architecture on which an embodiment of the invention is implemented. A multifunctional peripheral device ("MFP") 102 is communicatively coupled to a smart card 104 via a communications link 106. In one embodiment, communications link 106 is a card reading device, installed onto the MFP, into and on which a smart card can be inserted and read. In another embodiment, the card reader has a contactless interface that uses electromagnetic waves to communicate with the smart card.

Figure 1B:
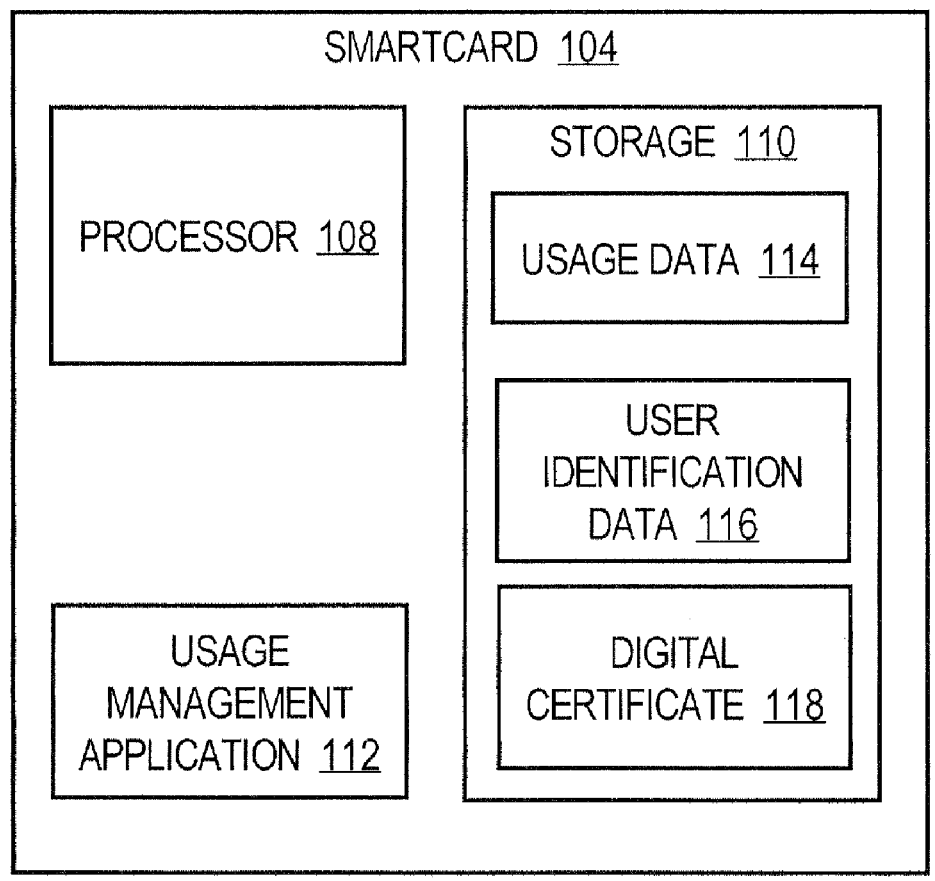
FIG. 1B is a block diagram that illustrates components of the smart card according to one embodiment of the invention.

Referring to FIG. 1B, smart card 104 is pocket-sized card with a processor 108 that can process data and instructions. Processsor 108 may be implemented by any number and type of processors, depending upon a particular implementation. Smart card 104 can also include storage 110 on which usage data 114, user identification data 116, and digital certificate 118 are stored. Storage 110 may be implemented by volatile storage, non-volatile storage, or any combination of volatile and non-volatile storage. In one embodiment of the invention, smart card 104 stores a plurality of digital certificates of trusted certificate authorities as well as its own digital certificate, and includes a means for using the certificates to authenticate other devices. Instructions comprising a user management application 112 are also included on smart card 104.

In one embodiment of the invention, the smart card used by the user authenticates the MFP. This authentication prevents usage data from being recorded onto the smart card by an unauthorized MFP. In such an embodiment, both the smart card and the MFP store digital certificates. Both the smart card and the MFP authenticate each other before protected data or resources are accessed by either device.

III. Managing Device Usage Data

Figure 2:
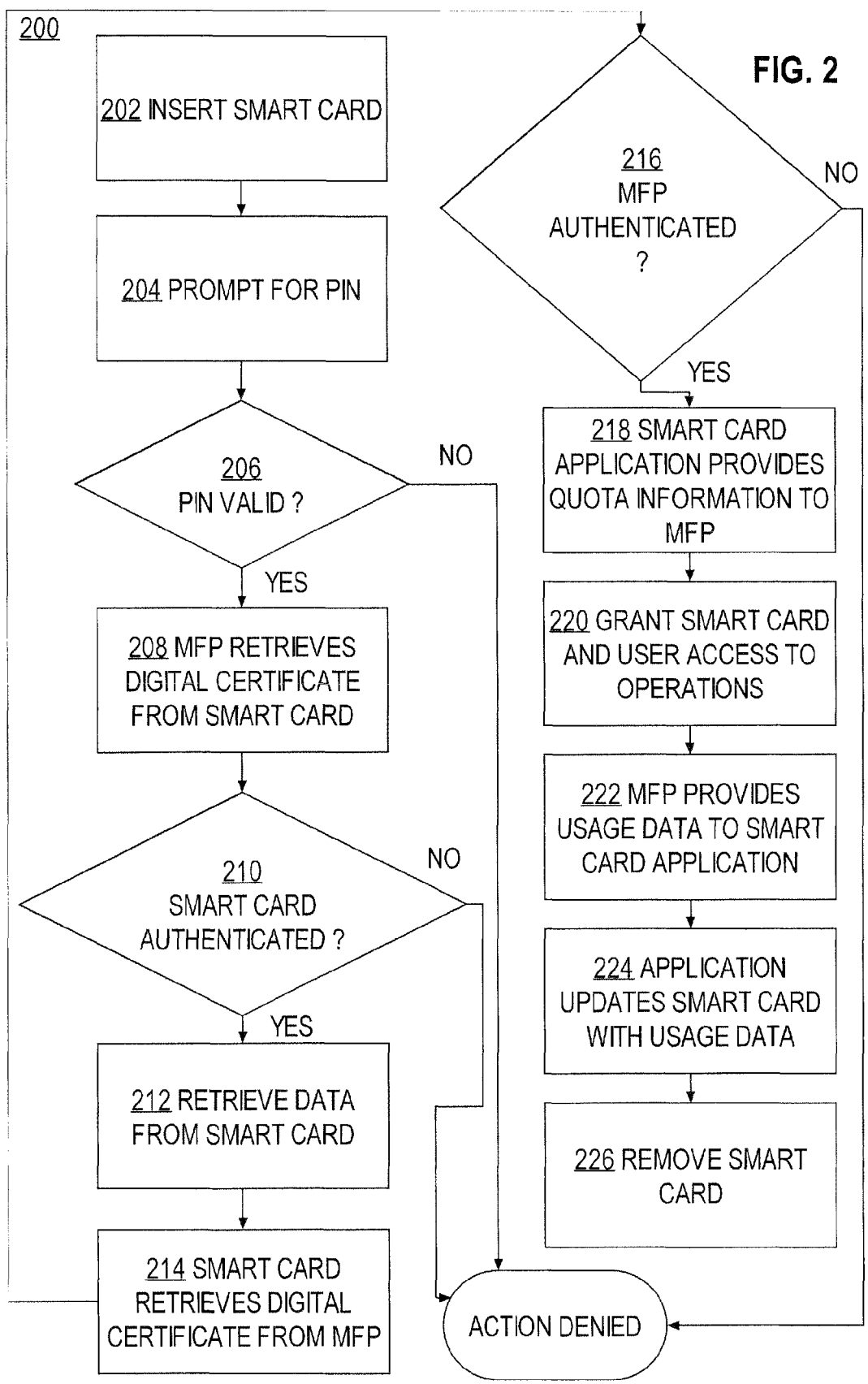
FIG. 2 is a flow diagram that illustrates one embodiment of the invention in which a user is limited by a quota that is stored and managed on the smart card.

FIG. 2 is a flow diagram 200 that depicts an approach for managing the usage of an MFP using a quota according to one embodiment of the invention. At step 202, a smart card, such as smart card 104 is inserted by a user into a card reader located on the MFP. In another embodiment of the invention, the smart card has a contactless interface. Such a contactless smart card communicates with the MFP through radio wave transponders located on the smart card and on the card reader, and no insertion into any card reader is necessary. At step 204, the MFP prompts the user for user identification data, for example, a personal identification number ("PIN"). At step 206, the MFP determines whether the user identification data is valid for the particular smart card. For example, the MFP determines whether the PIN that was entered is valid for the smart card. Upon an affirmative determination, at step 208, the MFP retrieves a digital certificate from the smart card, such as digital certificate 118. At step 210, the MFP authenticates the smart card using the digital certificate. A wide variety of techniques may be used to authenticate the smart card. For example, the MFP maintains digital certificates of trusted certificate authorities, one of which issued the digital certificate to the smart card. The MFP validates the digital signature in smart card's digital certificate with data from the issuing authority's digital certificate, and authenticates the smart card. According to another embodiment of the invention, the MFP communicates with a server that has the certificates and keys necessary to authenticate the smart card. According to an embodiment of the invention, communication from the MFP to the smart card is encrypted by the smart card's public key as extracted from the digital certificate.

If the authentication is successful, then at step 212, the MFP attempts to retrieve quota data from the smart card, according to one embodiment of the invention. For example, the MFP requests quota and resource usage information from the smart card in order to set a limit on the quantity of resources to make available to the particular smart card and user. According to one embodiment, the MFP attempts to submit usage data to the smart card. In another embodiment, the authentication of the MFP is performed before any further communication with the MFP is allowed. In response to the request for quota information, at step 214, the smart card retrieves a digital certificate from the MFP for the purpose of authenticating the MFP. At step 216, the smart card locally authenticates the MFP using a conventional authentication technique. According to one embodiment of the invention, the smart card maintains digital certificates of trusted certificate authorities, one of which issued the digital certificate to the MFP. The smart card locally executes instructions to validate the digital signature in the MFP's digital certificate with the digital certificate for the issuing authority, and authenticates the smart card. If the authentication is successful, then at step 218, the MFP is provided with requested quota and resource usage information by a usage management application stored on the smart card that is executed by the smart card, such as usage management application 112. In one embodiment of the invention, the application is a Java application.

At step 220, based on the data that the usage management application of the smart card provides to the MFP, the MFP makes available a certain quantity of operations and resources to the user. At step 222, after the user completes the desired operations, the MFP sends usage data to the smart card for updating the smart card's usage records. In one embodiment of the invention, the usage data, such as usage data 114, includes information about the quantity of pages printed or scanned, whether the pages are in color, or black and white, the quantity of ink or toner used, the number of staples used, or the size of the data files produced by the scanning. At step 224, the application updates the usage records on the smart card with the usage data. At step 226, the user removes the smart card from the MFP, and the session is ended.

Figure 3:
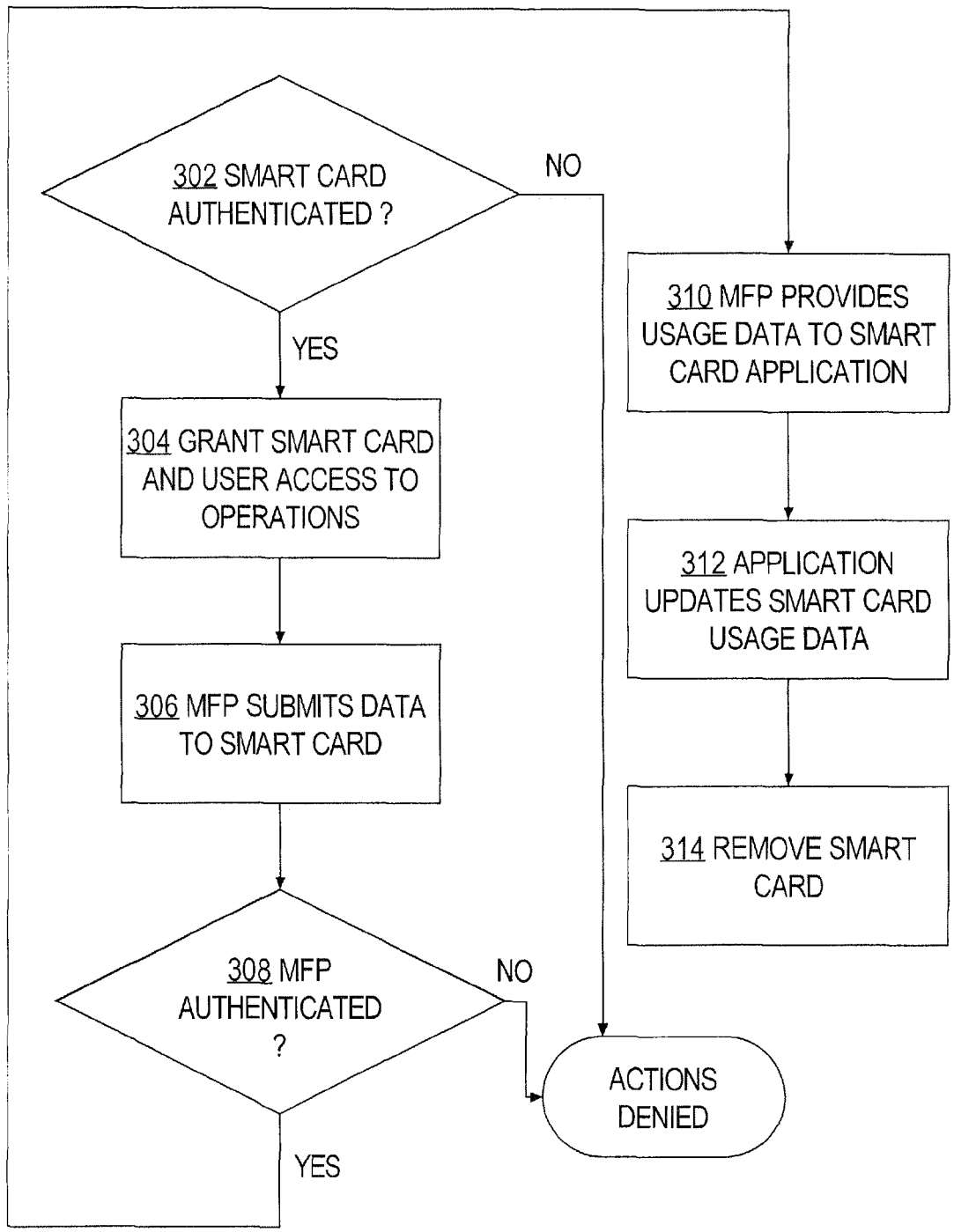
FIG. 3 is a flow diagram that illustrates one embodiment of the invention in which a smart card maintains a record of a user's resource usage that is stored and managed on the smart card.

Referring to FIG. 3, flow diagram 300 illustrates one embodiment of the invention in which a user is not limited by any quota in using the resources of the MFP. At step 302, steps 202 through 210 are performed to authenticate the smart card. At step 304, upon authentication of the smart card, the MFP makes available its resources and operations to the user. At step 306, after the user completes the desired operations, the MFP attempts to submit usage data to the smart card. At step 308, steps 216 through 218 are performed to authenticate the MFP.

If the authentication is successful, at step 310, the MFP sends usage data to the smart card for updating the smart card's usage records. At step 312, the smart card's usage management application updates the usage records on the smart card with the usage data. At step 314, the user removes the smart card from the MFP, and the session is ended. The data from the smart card is retrieved by the organization at a later time through the auditing application's interface to audit the user's usage of all peripheral resources in the organization.

Figure 4:
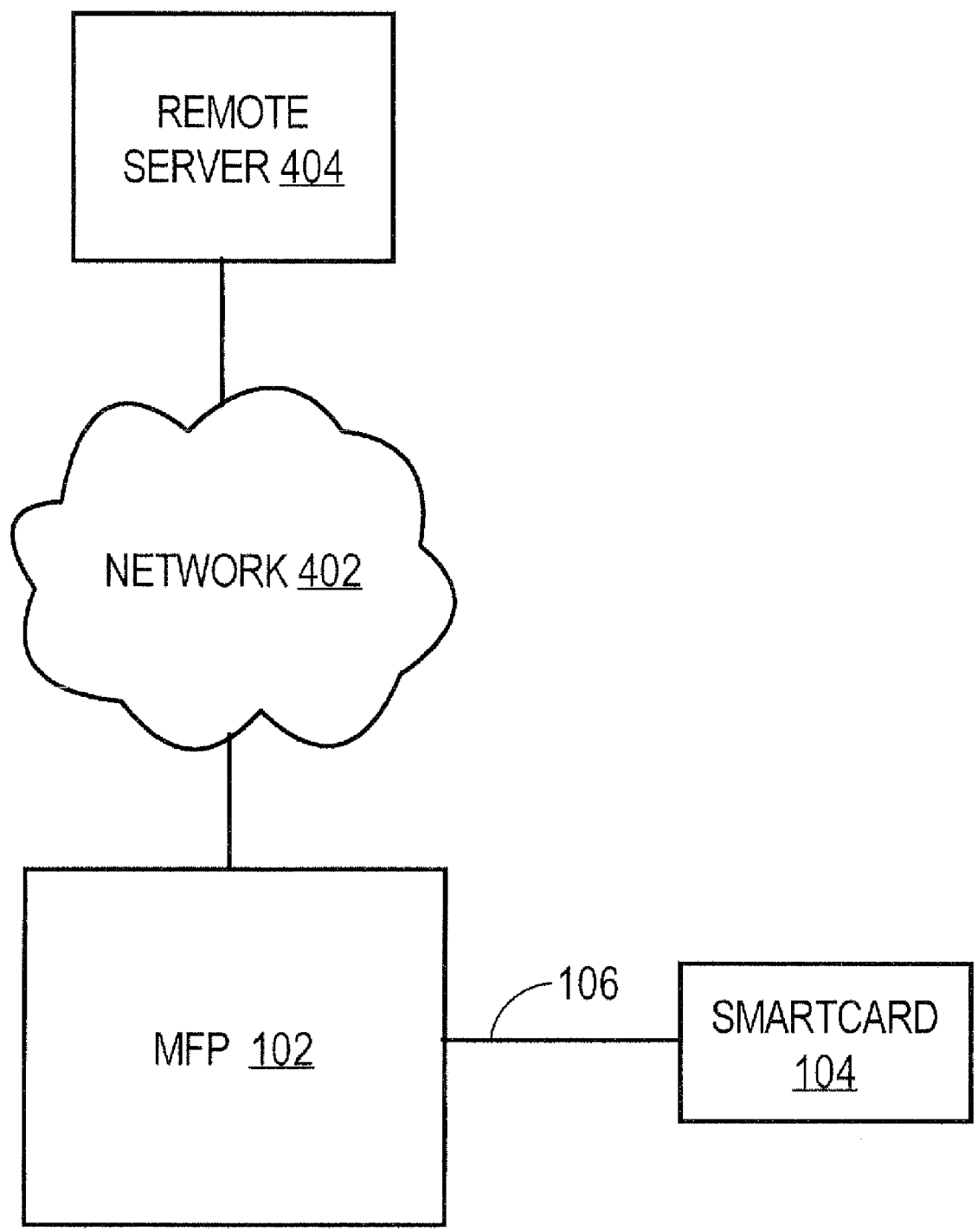
FIG. 4 is a block diagram that illustrates a remote server in relation to a multifunctional peripheral device and a smart card.

FIG. 4 is a block diagram that illustrates another architecture on which an embodiment of the invention may be implemented. MFP 102 is coupled, through network 402, to remote server 404.

Figure 5:
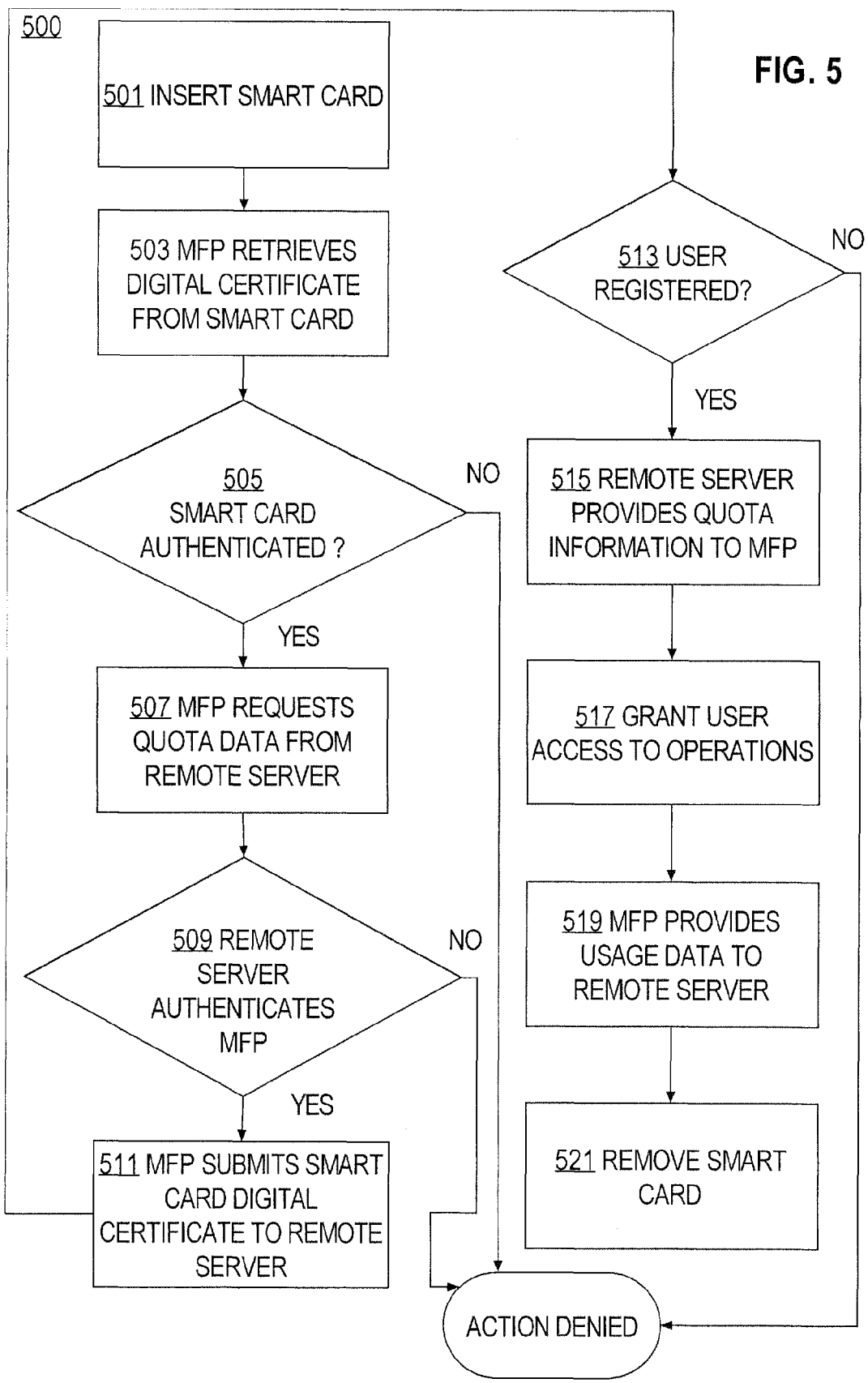
FIG. 5 is a flow diagram that illustrates one embodiment of the invention in which a remote server is used to authenticate a multifunctional peripheral device, as well as track usage data.

Referring to FIG. 5, flow diagram 500 illustrates an embodiment of the invention wherein a remote server performs the functions of authenticating the MFP and tracking usage data of a user. At step 501, a smart card is inserted by a user into a card reader located on the MFP. At step 503, the MFP retrieves a digital certificate from the smart card. Then, at step 505, the MFP authenticates the smart card using the digital certificate by one of the aforementioned approaches, or according to an approach available in the art for performing such an authentication. At step 507, the MFP requests quota and past usage information for the user from a remote server. At step 509, the remote server requests a digital certificate from the MFP to authenticate the MFP. At step 511, upon successful authentication, the MFP submits the smart card's digital certificate to identify the user account associated with the smart card. At step 513, the remote server determines from the digital certificate whether the user is a registered user. Upon an affirmative determination, at step 515, the remote server sends quota and usage information to the MFP. According to another embodiment, quota information is not necessary, and operations and resources are made available to the user regardless of past usage data. Based on the usage data provided, at step 517, the MFP makes available a certain quantity of operations and resources to the user. At step 519, after the user completes the desired operations, the MFP sends usage data to the remote server for updating the user account's usage records. At step 521, the user removes the smart card from the MFP, and the session is ended.

IV. Implementation Mechanisms

Figure 6:
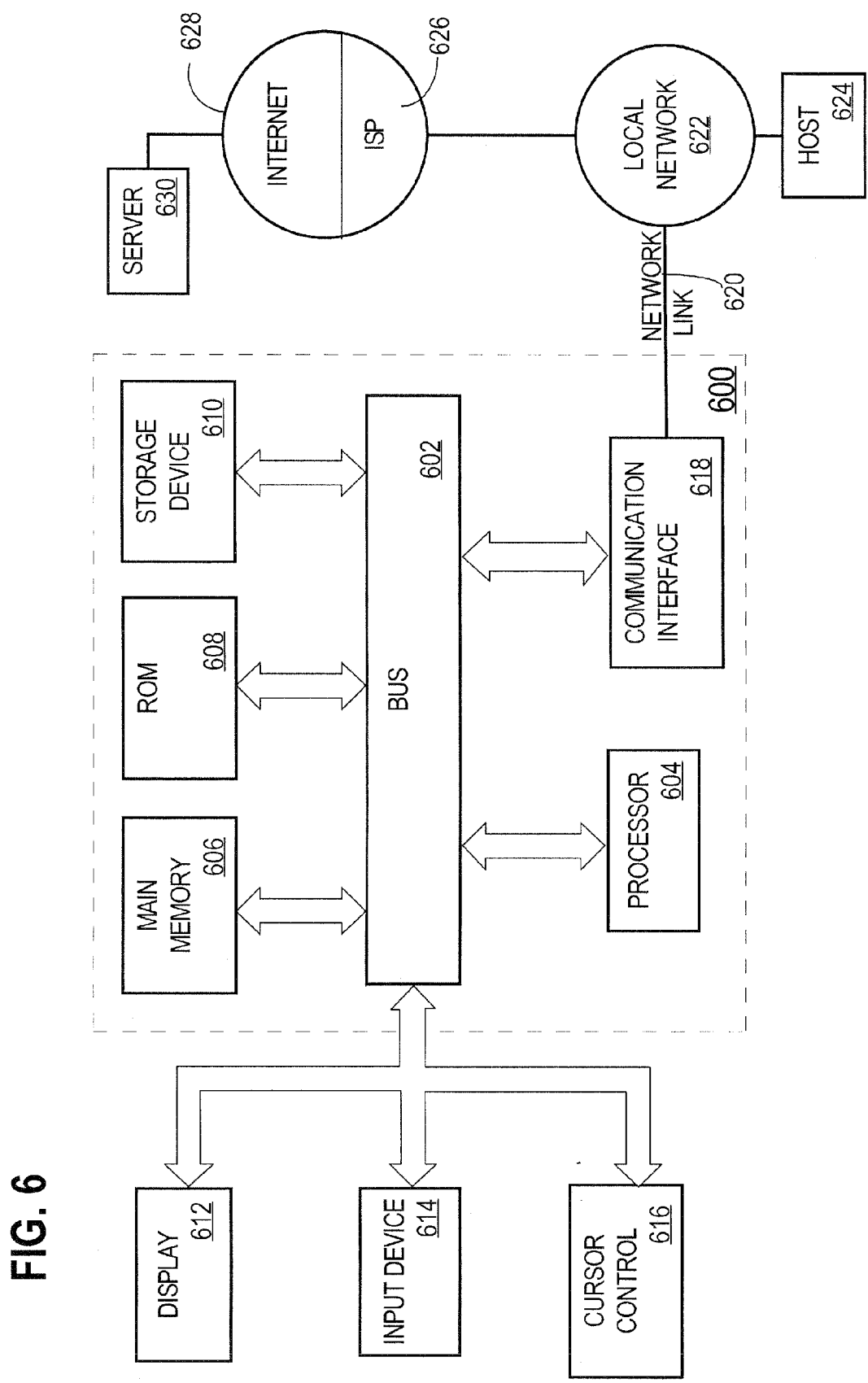
FIG. 6 is a block diagram that illustrates a system on which one embodiment of the invention may be implemented.

FIG. 6 is a block diagram that illustrates a computer system 600 upon which an embodiment of the invention may be implemented. One embodiment of the invention is implemented on a peripheral device that has one or more of the features of computer system 600. Another embodiment of the invention is implemented on a smart card that has one or more of the features of computer system 600. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 606 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A device configured for tracking usage, comprising:
one or more processors; and
a memory coupled to the one or more processors and storing instructions which, when processed by the one or more processors, causes:
the device establishing communication with a smart card;
the device receiving a first digital certificate from the smart card;
the device authenticating the smart card based on the first digital certificate;
the device receiving a request from the smart card for a second digital certificate;
in response to receiving the request from the smart card for the second digital certificate, the device submitting the second digital certificate to the smart card for the smart card to authenticate the device using the second digital certificate;
based on successful authentication of the smart card by the device using the first digital certificate, the device providing user access to device operations;
the device generating usage data that indicate usage of the device operations; and
in response to successful authentication of the device by the smart card using the second digital certificate, the device communicating the usage data to a usage data management application executing on the smart card, wherein the usage data management application updates a usage record of a plurality of usage records with the usage data.

2. The device as recited in claim 1, wherein the device comprises one of a multifunctional peripheral, a printer, a photocopier, a facsimile machine, and a scanner.

3. The device as recited in claim 1, wherein the usage data management application is a Java application.

4. The device as recited in claim 1, wherein execution of the instructions further causes:
before retrieving the first digital certificate, the device requesting user identification data; and
the device determining whether the user identification data is valid.

5. The device as recited in claim 1, wherein execution of the instructions further causes:
before providing operations, the device requesting quota data from the smart card; and
the device limiting a quantity of operations provided based on the quota data.

6. The device as recited in claim 1, wherein the usage data includes at least one of a quantity of pages printed, a quantity of pages scanned, a quantity of printing consumables consumed, and a quantity and type of pages printed.

7. A smart card configured for tracking usage of a multifunctional peripheral, comprising:
one or more processors; and
a memory coupled to the one or more processors and storing instructions which, when processed by the one or more processors, causes:
the smart card establishing communication with a multifunctional peripheral;
the smart card providing a first digital certificate to the multifunctional peripheral for the multifunctional peripheral to authenticate the smart card using the first digital certificate;
the smart card receiving a second digital certificate from the multifunctional peripheral;
the smart card authenticating the multifunctional peripheral using the second digital certificate;
the smart card being granted user access to operations from the multifunctional peripheral in response to successful authentication of the smart card by the multifunctional peripheral using the first digital certificate;
in response to successfully authenticating the multifunctional peripheral by the smart card using the second digital certificate, the smart card receiving usage data based on the operations from the multifunctional peripheral, and the smart card updating a usage record of a plurality of usage records with the usage data.

8. The smart card as recited in claim 7, wherein the smart card has a computing architecture including a processor capable of executing instructions, and at least one of volatile or non-volatile memory.

9. The smart card as recited in claim 7, wherein execution of the instructions further causes:
the smart card receiving a request for quota data from the multifunctional peripheral; and
the smart card providing quota data to the multifunctional peripheral.

10. The smart card as recited in claim 7, wherein the plurality of usage records are managed by a usage data management application that is executed on the smart card.

11. A device configured for tracking usage, comprising:
one or more processors; and
a memory coupled to the one or more processors and storing instructions which, when processed by the one or more processors, causes:
the device establishing communication with a smart card;
the device receiving a first digital certificate from the smart card;
the device authenticating the smart card based on the first digital certificate;
the device receiving a request from a remote server for a second digital certificate;
in response to receiving the request from the remote server for the second digital certificate, the device submitting the second digital certificate to the remote server for the remote server to authenticate the device using the second digital certificate;
the device submitting the first digital certificate to the remote server for the remote server to use the first digital certificate to identify a user account associated with the smart card;
in response to successful authentication of the smart card by the device using the first digital certificate, the device providing user access to device operations;
the device generating usage data that indicate usage of the device operations; and in response to successful authentication of the device by the remote server using the second digital certificate and in response to successful identification of the user account associated with the smart card by the remote server using the first digital certificate, the device communicating the usage data for updating the user account at the remote server.

12. The device as recited in claim 11, wherein execution of the instructions further causes: before providing operations, the device requesting quota data from the remote server; and
the device limiting a quantity of operations provided based on the quota data.

13. A computer-implemented method for tracking usage of a device, the method comprising:
the device establishing communication with a smart card;
the device receiving a first digital certificate from the smart card;
the device authenticating the smart card based on the first digital certificate;
the device receiving a request from the smart card for a second digital certificate;
in response to receiving the request from the smart card for the second digital certificate, the device submitting the second digital certificate to the smart card for the smart card to authenticate the device using the second digital certificate;
based on successful authentication of the smart card by the device issuing the first digital certificate, the device providing user access to device operations;
the device generating usage data that indicate usage of the device operations; and
in response to successful authentication of the device by the smart card using the second digital certificate, the device communicating the usage data to a usage data management application executing on the smart card, wherein the usage data management application updates a usage record of a plurality of usage records with the usage data.

14. The computer-implemented method of claim 13, wherein the device comprises one of a multifunctional peripheral, a printer, a photocopier, a facsimile machine, and a scanner.

15. The computer-implemented method of claim 13, wherein the usage data management application is a Java application.

16. The computer-implemented method of claim 13, further comprising:
before retrieving the first digital certificate, the device requesting user identification data; and
the device determining whether the user identification data is valid.

17. The computer-implemented method of claim 13, further comprising:
before providing operations, the device requesting quota data from the smart card; and
the device limiting a quantity of operations provided based on the quota data.

18. The computer-implemented method of claim 13, wherein the usage data includes at least one of a quantity of pages printed, a quantity of pages scanned, a quantity of printing consumables consumed, and a quantity and type of pages printed.

19. A computer-implemented method for tracking usage of a multifunctional peripheral, the method comprising:
a smart card establishing communication with a multifunctional peripheral;
the smart card providing a first digital certificate to the multifunctional peripheral for the multifunctional peripheral to authenticate the smart card using the first digital certificate;
the smart card receiving a second digital certificate from the multifunctional peripheral;
the smart card authenticating the multifunctional peripheral using the second digital certificate;
the smart card being granted user access to operations from the multifunctional peripheral in response to successful authentication of the smart card by the multifunctional peripheral using the first digital certificate;
in response to successfully authenticating the multifunctional peripheral by the smart card using the second digital certificate, the smart card receiving usage data based on the operations from the multifunctional peripheral; and
the smart card updating a usage record of a plurality of usage records with the usage data.

20. The computer-implemented method of claim 19, wherein the smart card has a computing architecture including a processor capable of executing instructions, and at least one of volatile or non-volatile memory.

21. The computer-implemented method of claim 19 further comprising:
the smart card receiving a request for quota data from the multifunctional peripheral; and
the smart card providing quota data to the multifunctional peripheral.

22. The computer-implemented method of claim 19, wherein the plurality of usage records are managed by a usage data management application that is executed on the smart card.

23. A computer-implemented method for tracking usage of a device, the method comprising:
the device establishing communication with a smart card;
the device receiving a first digital certificate from the smart card;
the device authenticating the smart card based on the first digital certificate;
the device receiving a request from a remote server for a second digital certificate;
in response to receiving the request from the remote server for the second digital certificate, the device submitting the second digital certificate to the remote server for the remote server to authenticate the device using the second digital certificate;
the device submitting the first digital certificate to the remote server for the remote server to use the first digital certificate to identify a user account associated with the smart card;
in response to successful authentication of the smart card by the device using the first digital certificate, the device providing user access to device operations;
the device generating usage data that indicate usage of the device operations; and
in response to successful authentication of the device by the remote server using the second digital certificate and in response to successful identification of the user account associated with the smart card by the remote server using the first digital certificate, the device communicating the usage data for updating the user account at the remote server.

24. The computer-implemented method of claim 23, further comprising:
before providing operations, the device requesting quota data from the remote server; and the device limiting a quantity of operations provided based on the quota data.

25. A non-transitory computer-readable medium storing instructions for storing and maintaining data, which, when processed by one or more processors, cause the one or more processors to perform:
- establishing communication with a smart card;
- receiving a first digital certificate from the smart card;
- authenticating the smart card based on the first digital certificate;
- receiving a request from the smart card for a second digital certificate;
- in response to receiving the request from the smart card for the second digital certificate, submitting the second digital certificate to the smart card for the smart card to authenticate a device using the second digital certificate;
- based on successful authentication of the smart card by the device issuing the first digital certificate, providing user access to device operations;
- generating usage data that indicate usage of the device operations; and
- in response to successful authentication of the device by the smart card using the second digital certificate, communicating the usage data to a usage data management application executing on the smart card, wherein the usage data management application updates a usage record of a plurality of usage records with the usage data.

26. A device configured for tracking usage, comprising:
- means for establishing communication with a smart card;
- means for receiving a first digital certificate from the smart card;
- means for authenticating the smart card based on the first digital certificate;
- means for receiving a request from the smart card for a second digital certificate;
- means for submitting, in response to receiving the request from the smart card for the second digital certificate, the second digital certificate to the smart card for the smart card to authenticate a device using the second digital certificate;
- means for providing user access to device operations in response to successful authentication of the smart card by the smart card using the second digital certificate;
- means for generating usage data that indicate usage of the device operations; and
- means for communicating the usage data to a usage data management application executing on the smart card in response to successful authentication of the device by the smart card using the second digital certificate, wherein the usage data management application updates a usage record of a plurality of usage records with the usage data.

* * * * *